(12) United States Patent
Wang et al.

(10) Patent No.: US 12,573,683 B2
(45) Date of Patent: Mar. 10, 2026

(54) BATTERY MODULE INCLUDING POUCH CELL MODULE WITH CELLS SEPARATED BY INSULATOR AND TABS EXTENDING ACROSS INSULATOR

(71) Applicant: Karma Automotive LLC, Irvine, CA (US)

(72) Inventors: Yangfan Wang, Aliso Viejo, CA (US); Jing Hong, Trabuco Canyon, CA (US)

(73) Assignee: Karma Automotive, Inc., Irvine, CA (US)

( * ) Notice: Subject to any disclaimer, the term of this patent is extended or adjusted under 35 U.S.C. 154(b) by 134 days.

(21) Appl. No.: 17/815,670

(22) Filed: Jul. 28, 2022

(65) Prior Publication Data

US 2022/0367933 A1 Nov. 17, 2022

Related U.S. Application Data

(63) Continuation of application No. 16/528,147, filed on Jul. 31, 2019, now Pat. No. 11,437,666.

(51) Int. Cl.
H01M 10/647 (2014.01)
H01M 10/04 (2006.01)
(Continued)

(52) U.S. Cl.
CPC ..... H01M 10/647 (2015.04); H01M 10/0413 (2013.01); H01M 10/613 (2015.04);
(Continued)

(58) Field of Classification Search
CPC ............. H01M 10/647; H01M 10/613; H01M 10/625; H01M 10/6554; H01M 10/0413;
(Continued)

(56) References Cited

U.S. PATENT DOCUMENTS 9,705,156 B2 7/2017 Dorsch
2007/0184341 A1* 8/2007 Yoon ................. H01M 10/0436
429/185

(Continued)

FOREIGN PATENT DOCUMENTS

CN 101689687 A 3/2010
CN 107615564 A 1/2018
(Continued)

OTHER PUBLICATIONS

USPTO, Office Action relating to U.S. Appl. No. 16/528,147, dated Feb. 4, 2022.
(Continued)

*Primary Examiner* — Sean P Cullen
(74) *Attorney, Agent, or Firm* — Honigman LLP; Grant Griffith; Thomas Appledorn

(57) ABSTRACT

A battery module made from a plurality of side-by-side pouch cell modules, wherein each pouch cell module is formed with a pair of cells on either side of an insulation pad with the cells in turn positioned between first and second metal brackets such that each cell contacts an insulation pad on one side and a metal bracket on the other. Also included is a pair of pressure plates at the ends of the stack of side-by-side pouch cells and a compression band wrapping around the plurality of side-by-side pouch cells and the pressure plates. A busbar electrically connects the plurality of side-by-side pouch cells together.

16 Claims, 6 Drawing Sheets

(51) Int. Cl.

| | |
|---|---|
| *H01M 10/613* | (2014.01) |
| *H01M 10/625* | (2014.01) |
| *H01M 10/6554* | (2014.01) |
| *H01M 50/116* | (2021.01) |
| *H01M 50/148* | (2021.01) |
| *H01M 50/502* | (2021.01) |
| *H01M 50/578* | (2021.01) |

(52) U.S. Cl.
CPC ..... *H01M 10/625* (2015.04); *H01M 10/6554* (2015.04); *H01M 50/116* (2021.01); *H01M 50/148* (2021.01); *H01M 50/502* (2021.01); *H01M 50/578* (2021.01); *H01M 2220/20* (2013.01)

(58) Field of Classification Search
CPC ............. H01M 50/502; H01M 50/116; H01M 50/578; H01M 50/148
USPC ................................. 429/156, 158, 159, 160
See application file for complete search history.

(56) References Cited

U.S. PATENT DOCUMENTS

| | | | | |
|---|---|---|---|---|
| 2010/0255351 | A1 | 10/2010 | Ijaz et al. | |
| 2011/0104545 | A1* | 5/2011 | Meintschel | H01M 10/6557 429/120 |
| 2012/0183840 | A1 | 7/2012 | Lee et al. | |
| 2015/0099146 | A1* | 4/2015 | Kim | H01M 10/625 429/53 |
| 2016/0126523 | A1* | 5/2016 | Arena | H01M 10/613 429/90 |
| 2016/0336563 | A1* | 11/2016 | Choi | H01M 50/291 |
| 2017/0077466 | A1* | 3/2017 | Choi | H01M 10/613 |
| 2017/0077559 | A1 | 3/2017 | Beaston et al. | |
| 2019/0074490 | A1* | 3/2019 | Ishimaru | H01M 50/507 |
| 2019/0280279 | A1* | 9/2019 | Lee | H01M 50/50 |
| 2020/0006741 | A1* | 1/2020 | Shin | H01M 50/211 |
| 2020/0136121 | A1* | 4/2020 | Allen | H01M 50/211 |

FOREIGN PATENT DOCUMENTS

| | | | | | |
|---|---|---|---|---|---|
| CN | 208336332 | U | 1/2019 | | |
| DE | 102014018942 | A1 | 6/2016 | | |
| EP | 2416439 | A2 | 2/2012 | | |
| KR | 10-2012-0074426 | A | 7/2012 | | |
| KR | 10-2015-0113827 | A | 10/2015 | | |
| KR | 2016016517 | A | * 2/2016 | ........... | H01M 10/04 |
| WO | WO-2018186660 | A1 | * 10/2018 | .............. | B60K 6/28 |
| WO | 201915026 | A1 | 1/2019 | | |

OTHER PUBLICATIONS

"Top." Merriam-Webster.com <http://Merriam-Webster.com> Dictionary, Merriam-Webster, <https://www.merriam-webster.com/dictionary/top>. Accessed Jun. 7, 2021 . (Year: 2021).

"Bottom." Merriam-Webster.com <http://Merriam-Webster.com> Dictionary, Merriam-Webster, <https://www.nnerriann-webster.conn/dictionary/bottonn>. Accessed Jun. 7, 2021. (Year: 2021).

International Search Report and Written Opinion dated Nov. 19, 2020 issued in related International Patent Application No. PCT/US2020/044540; filed Jul. 31, 2020.

China Patent Office, Office Action for Application 202080066722.0 dated Feb. 22, 2024.

European Patent Office, EP Search Report for Application No. 20848366.9 dated Apr. 25, 2024.

\* cited by examiner

31

32, 34

31

BATTERY MODULE INCLUDING POUCH CELL MODULE WITH CELLS SEPARATED BY INSULATOR AND TABS EXTENDING ACROSS INSULATOR

CROSS REFERENCE TO PRIOR APPLICATIONS

This U.S. patent application is a continuation of, and claims priority under 35 U.S.C. § 120 from, U.S. patent application Ser. No. 16/528,147, filed on Jul. 31, 2019. The disclosure of this prior application is considered part of the disclosure of this application and is hereby incorporated by reference in its entirety.

TECHNICAL FIELD

The present application relates to systems for holding battery pouch cells together as a unit for use in electric vehicles and to systems that remove heat from such pouch cell units so as to enhance battery performance.

BACKGROUND

The battery power source used in electric vehicles such as, for example, automobiles, typically includes a large number of individual battery pouch cell modules in close contact with one another. Pouch cells provide optimal use of space and packaging efficiencies. Unfortunately, a major problem with stacking these electric vehicle battery pouch cells close together is the heat generated by the individual battery cells. Battery overheating causes problems. First, it results in overall power efficiency being compromised. Second, such overheating also presents safety concerns.

Unfortunately, efficiently removing heat from electric vehicle battery cells has proven to be difficult. One existing solution to this problem has been to use a cooling gel in the battery module. In this approach, the thermal glue or gel is applied inside of the bottom enclosure to remove heat from the bottom enclosure. This typically results in a large temperature difference across the cell perpendicular to the cooling surface because the glue or gel is only at the bottom of the enclosure. Another approach has been to hold the individual battery cells together in a plastic frame and then to cool the plastic frame together with a cooling foam. This is not cost effective and has a high risk of liquid leaking inside the module. It would instead be desirable to provide a system of enhanced electric vehicle battery cooling for battery cells stacked close together that provides better temperature control at a lower cost. In addition, it would be desirable to provide a battery cell stacking system that physically protects the individual battery cells.

SUMMARY

In accordance with the present application, a system for holding together a plurality of electric vehicle battery pouch cells is disclosed herein. As will be shown, the present system both protects the individual cells and also efficiently removes heat from them. In a preferred aspect, the present system includes: (a) a plurality of pouch cell modules positioned together side-by-side, wherein each pouch cell module includes: (i) a first bracket, (ii) a second bracket, (iii) a pair of battery cells positioned between the first and second brackets, and (iv) an insulation pad positioned between the pair of battery cells; (b) a pair of pressure plates, with one pressure plate disposed on each side end of the battery module; (c) at least two compression bands wrapped around the plurality of side-by-side pouch cells and the end pressure plates; and (d) a busbar electrically connecting the plurality of side-by-side pouch cell modules together. Preferably also included are a top cover spanning across the tops of the plurality of side-by-side pouch cell modules; and a bottom cover spanning across the bottoms of the plurality of side-by-side pouch cell modules.

In preferred embodiments, each of the parallel connected cells in the pouch cell modules have top and bottom tabs that are fastened together. A busbar is then welded to the top and bottom tabs of the cell modules to provide electric communication between all of the cells.

In preferred embodiments, each individual pouch cell module's first bracket has longitudinally extending side edges and the second bracket is positioned between (i.e.: received within) the longitudinally extending side edges of the first bracket. As such, a pouch cell module is provided with two battery cells held between the first and second brackets with the insulation pad positioned between these two cells. As a result, each individual battery cell has one face in contact with a metal bracket and the other face in contact with an insulation pad. This pattern is repeated across the length of the overall assembly as the pouch cell modules are stacked together side-by-side. This novel design offers enhanced cooling benefits since every battery cell in the assembly is in direct physical contact with a metal bracket on one side. This allows excess heat to be quickly and efficiently conducted away from the battery cells. Additionally, having the insulation pad positioned between the cells keeps the excess heat from each individual battery cell directed away from the insulation pad and into one of the adjacent metal brackets. To assist with heat conduction, the first and second brackets may preferably be made of aluminum, and to prevent heat transmission, the insulation pad may be made of a thermally insulating material having a low thermal conductivity.

Preferably as well, the top and bottom covers of the device may have edges that wrap around the top and bottom ends of the plurality of pouch cell modules and the first brackets may have notches therein for the compression band to be received therein as it wraps around the full assembly.

A first advantage of the present system is that it provides enhanced cooling performance by conducting heat away from each battery cell, as each battery cell is in contact with one or the other of the module's first and second metal brackets.

A second advantage of the present system is that there is no possibility for coolant leakage in the modules (as compared to existing systems that circulate a cooling fluid through a cold plate between the individual cells).

A third advantage of the present system is that its design is completely modular. As such, different numbers of pouch cell modules can be stacked together side-by-side with the present system operating the same way in each of its various arrangements (i.e.: with more or fewer pouch cells). As a result, more pouch cell modules may be added, or pouch cell modules removed from the system, all depending upon user requirements.

A fourth advantage of the present system is that it can be used with different pouch cell wirings such as pouch cells can be wired together in 3S8P (i.e.: 3 batteries in series, 8 batteries in parallel) or 3P12S (i.e.: 3 batteries in series, 12 batteries in parallel), 6P8S (i.e.: 6 batteries in parallel, 8 batteries in series) and or any other desired configuration.

A fifth advantage of the present system is that it provides structural protection to the battery cells. Specifically, its metal brackets are much stiffer than comparable plastic frames which had been used in existing foam designs. Additionally, the present brackets will not cause any internal leaking of coolant.

DETAILED DESCRIPTION

Figure 1:
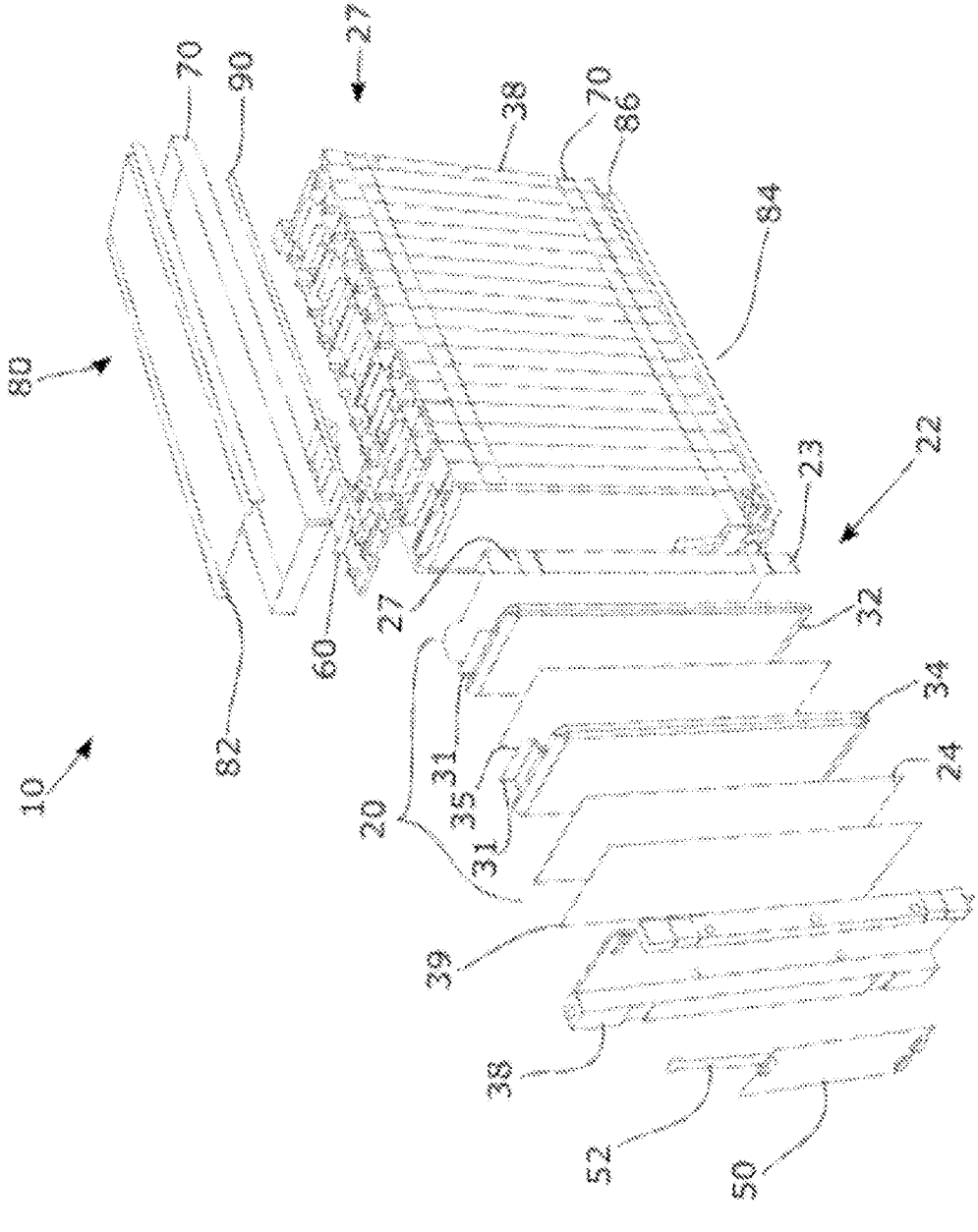
FIG. 1 is a partially exploded perspective view of the present system.
Figure 2:
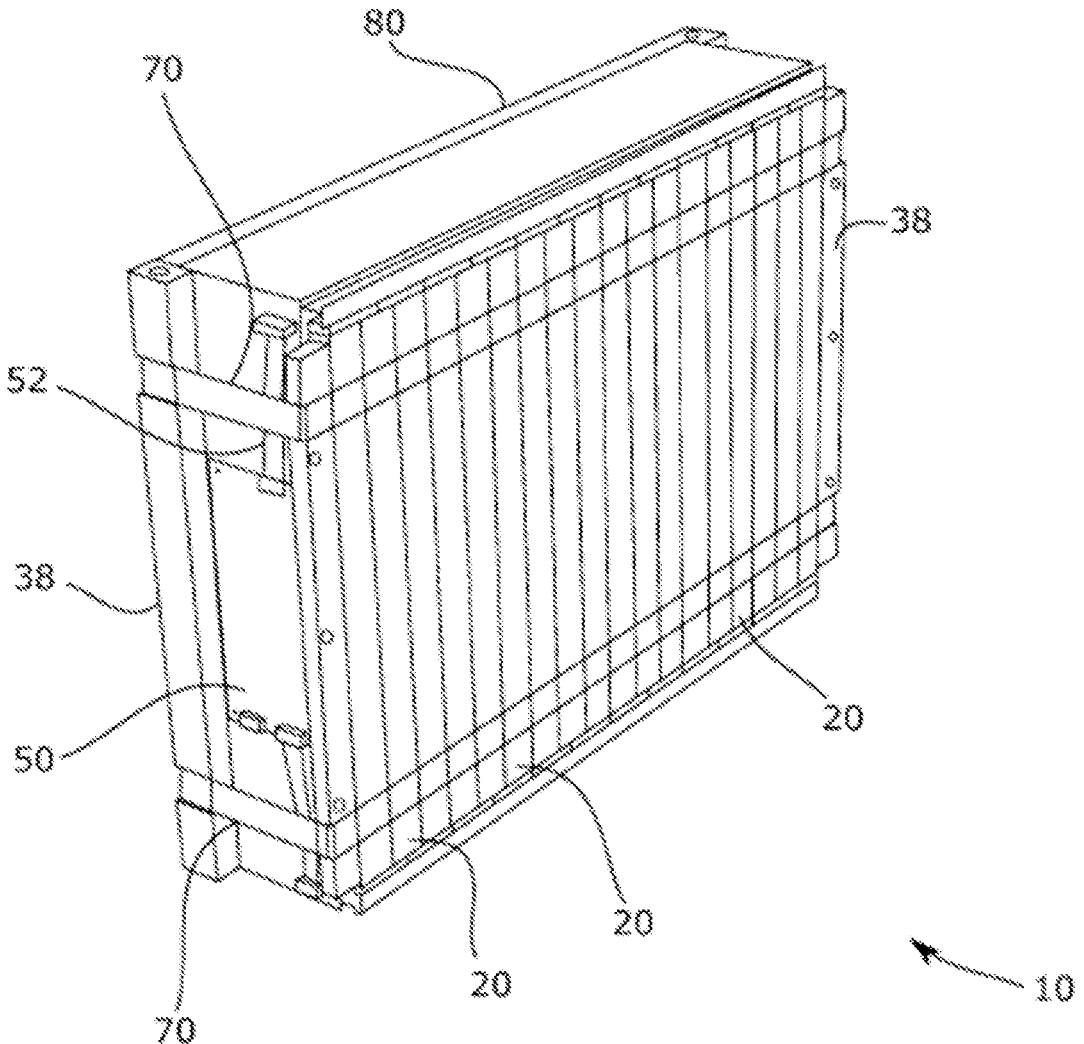
FIG. 2 is an assembled perspective view corresponding to FIG. 1.

As shown in FIGS. 1 and 2, a battery module 10 is provided. Module 10 includes a plurality of pouch cell modules 20 positioned together side-by-side. Each pouch cell module 20 includes a first bracket 22 and a second bracket 24. A pair of pouch cells 32 and 34 is positioned between the first and second brackets 22 and 24. An insulation pad 35 is positioned between cells 32 and 34, as shown. In operation, brackets 22 and 24 provide strong structural support at the sides of cells 32 and 34. In addition, brackets 22 and 24 are preferably made from a highly thermally conductive material which may optionally be aluminum to efficiently conduct excess heat away from cells 32 and 34. Preferably as well, cells 32 and 34 have large side surface areas (see FIG. 3) which directly contact brackets 22 and 24 so as to ensure efficient thermal energy transfer. As can also be seen, each individual battery cell (i.e.: every cell 32 or 34) in each pouch cell module 20 in overall system module 10 is in direct physical contact with a metal bracket (either 22 or 24) such that heat can be quickly and efficiently conducted away from the cells. Preferably, first and second brackets 22 and 24 are made of aluminum, or other suitable highly thermally conductive material, and the insulation pad is preferably made of low thermal conductivity material, or any suitable insulating material.

A pressure plate 38 is provided on each of the two side ends of battery module 10. An optional insulation pad 39 may be provided adjacent to each pressure plate 38 to prevent overheating at the lateral ends of the device module 10. An optional slave board or module control unit 50 can be attached to pressure plate 38 by a harness 52. Slave board 50 can optionally be used to measure cell voltage and temperature and communicate this information with a battery management unit.

Figure 3:
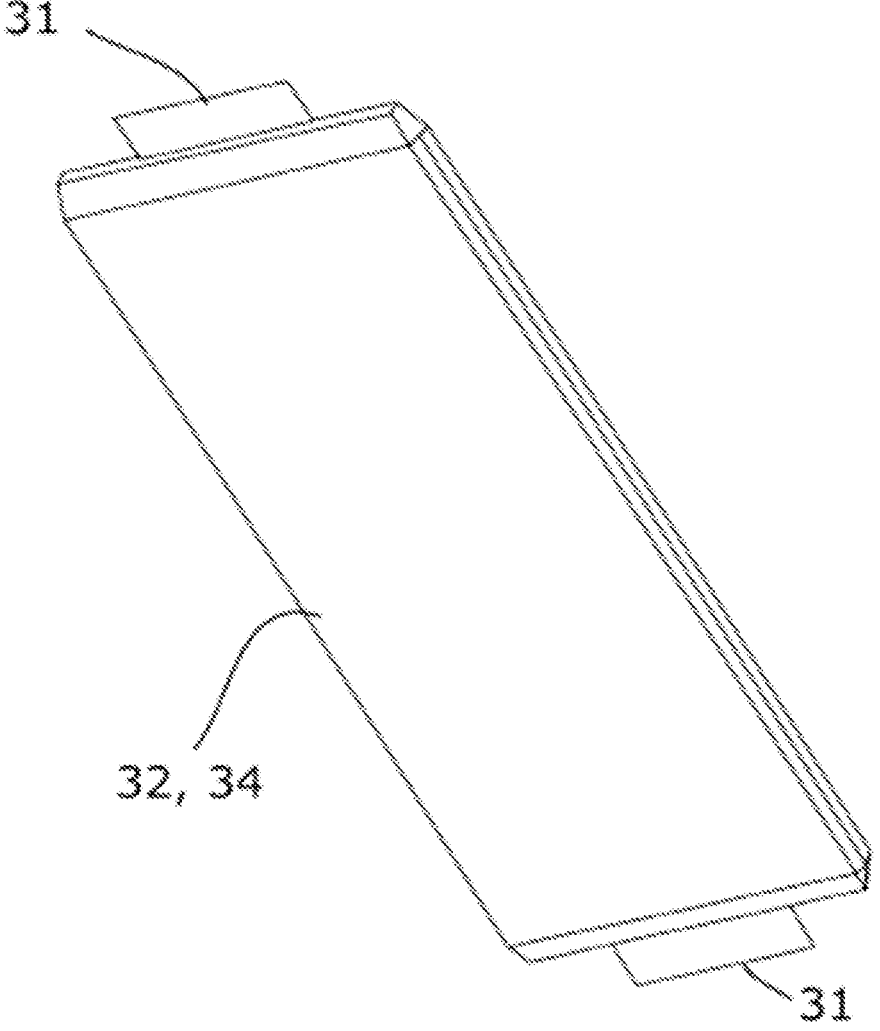
FIG. 3 is a perspective view of one of the individual battery cells.

A busbar 60 is provided to electrically connect each of the plurality of side-by-side pouch cell modules 20 together. As best seen in FIG. 3, each of cells 32 and 34 may have top and bottom tabs 31 extending therefrom, and the top and bottom tabs are fastened together. Specifically, this placement also keeps each of cells 32 and 34 in direct physical contact with insulation pad 35. It also assists in holding the whole pouch cell module 20 together as busbar 60 is also electrically and preferably physically connected to tabs 31. In preferred embodiments, busbar 60 is ultrasonically welded to the top tabs 31 of the cells 32 and 34.

As can also be seen in FIG. 1, first bracket 22 may have longitudinally extending side edges 23 that are received around second bracket 24 such that cells 32 and 34 together with insulation pad 35 are all positioned between the longitudinally extending side edges 23 of first bracket 22. This has the advantage of providing structural stability to each pouch cell module 20.

In preferred aspects, at least one compression band 70 is wrapped around the plurality of side-by-side pouch cell modules 20 and the pair of pressure plates 38. In one preferred aspect, the longitudinally extending side edges 23 of the first brackets 22 all have notches 27 therein such that the compression band 70 can be is received into the notches, thereby holding the full assembly together. To further provide structural stability, also provided are an optional top cover 80 spanning across the tops of the plurality of side-by-side pouch cell modules 20 and an optional bottom cover 84 spanning across the bottoms of the plurality of side-by-side pouch cell modules 20. Top cover 80 preferably has downwardly extending edges 82 that wrap around top ends of each of the plurality of pouch cell modules 20, and the bottom cover 84 preferably has upwardly extending edges 86 that wrap around bottom ends of each of the plurality of pouch cell modules 20. As can be seen, the at least one compression bands 70 preferably includes an upper compression band and a lower compression band both wrapping around the plurality of side-by-side pouch cells 32/34 (and also wrapping around the two end pressure plates 38). It is to be understood, however, that any number of compression bands 70 may be provided as desired. In addition, such compression bands may be thin and only cover only a small portion of the device, or may be wide and cover a large or very large portion of the surfaces longitudinally extending side edges 23.

It is to be understood that the present system is not limited to any particular wiring arrangements for electrically connecting together the individual batteries used in each of cells 32 and 34. For example, the present system can be used with different pouch cell wiring designs such as pouch cells wired together in 3S4P (i.e.: 3 batteries in series, 4 batteries in parallel) or 3P12S (i.e.: 3 batteries in series, 12 batteries in parallel), 6P8S (i.e.: 6 batteries in parallel, 8 batteries in series) and or any other desired configuration.

In optional embodiments, a voltage and temperature sensing board 90 can be positioned in electrical communication with each of the plurality of side-by-side pouch cell modules 20. Voltage and temperature sensing board 90 can optionally measure the voltage from each cell group and the temperature at several locations. These signals can then be communicated to a master battery management unit (not shown) for processing.

Figure 4:
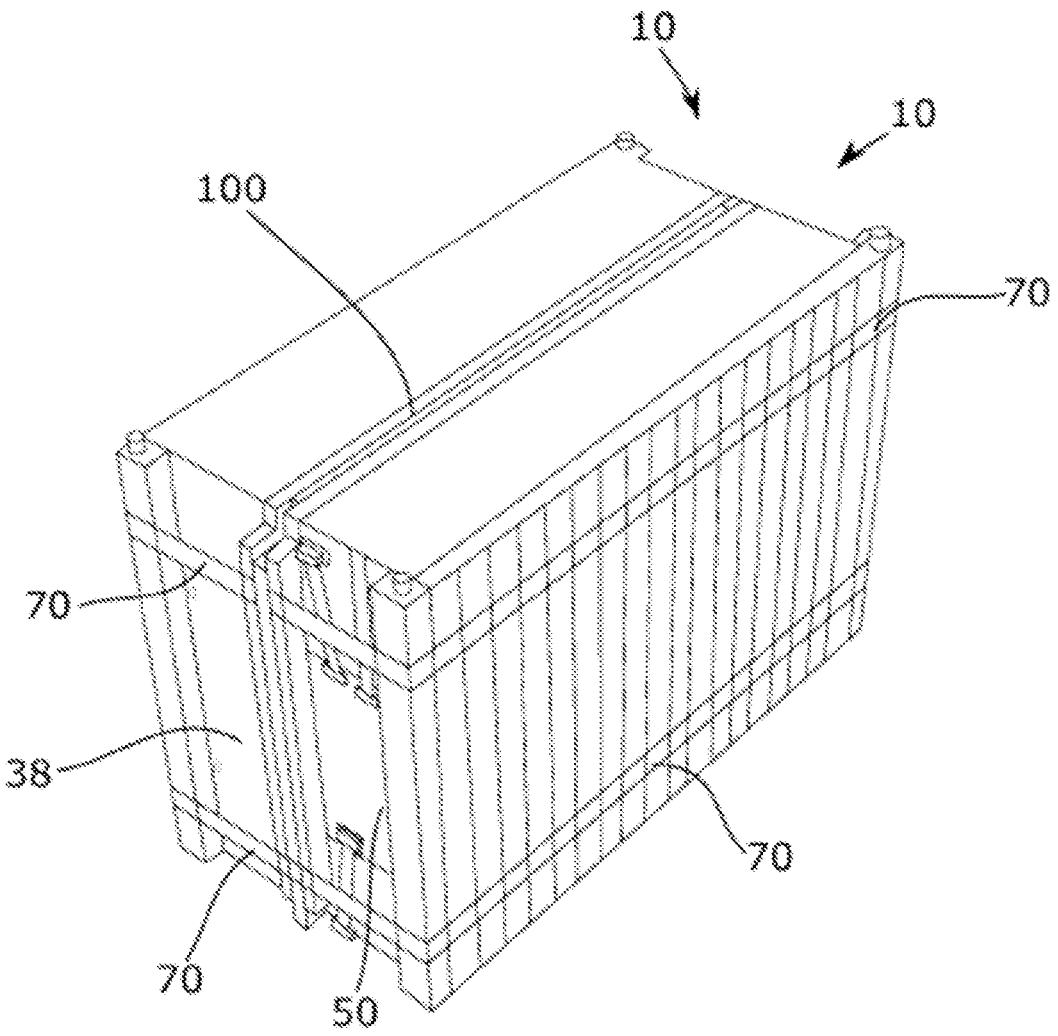
FIG. 4 is a perspective view of a pair of the systems of FIGS. 1 and 2 positioned side-by-side and separated by a cooling plate.

As seen in FIG. 4, a pair of the present battery module devices 10 can be positioned together side-by-side with a cooling plate 100 therebetween. Cooling plate 100 functions similar to brackets 22 and 24 described above and may be made of the same material(s). Cooling plate 100 may optionally be made of aluminum with coolant circulating therein. Between the cooling plate and the modules there is enough thermal interface material to transfer heat from the module to the cooling plate. The advantage of the embodiment of the present system shown in FIG. 4 is simply that it provides more power (and meet a voltage range requirement) than the single embodiment shown in FIG. 1. The present design's modularity provides such advantages as various numbers of pouch cells 32/34 can be stacked in each

Figure 5:
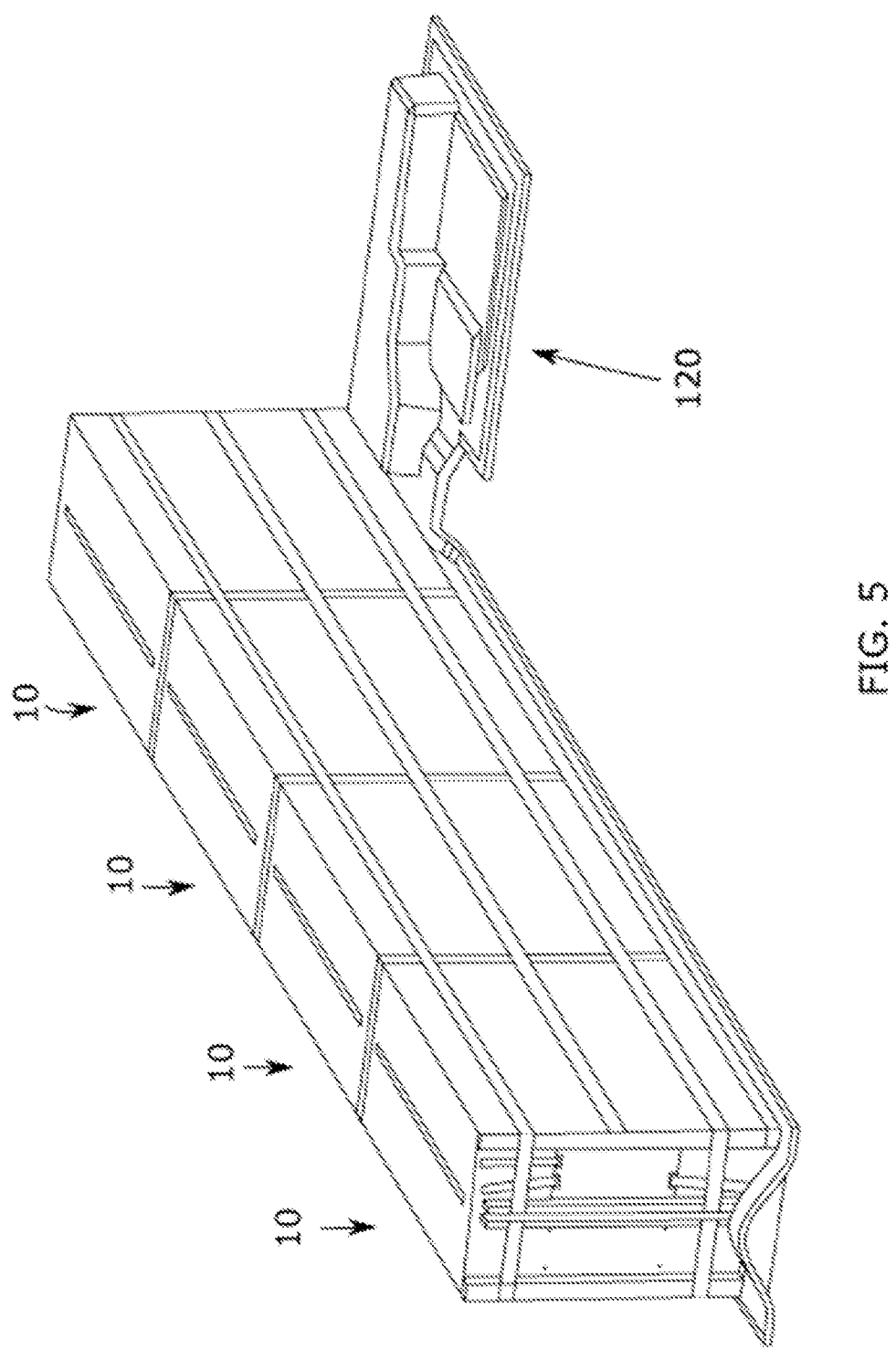
FIG. 5 is a plurality of systems of FIG. 4 positioned together end-to-end.
Figure 6:
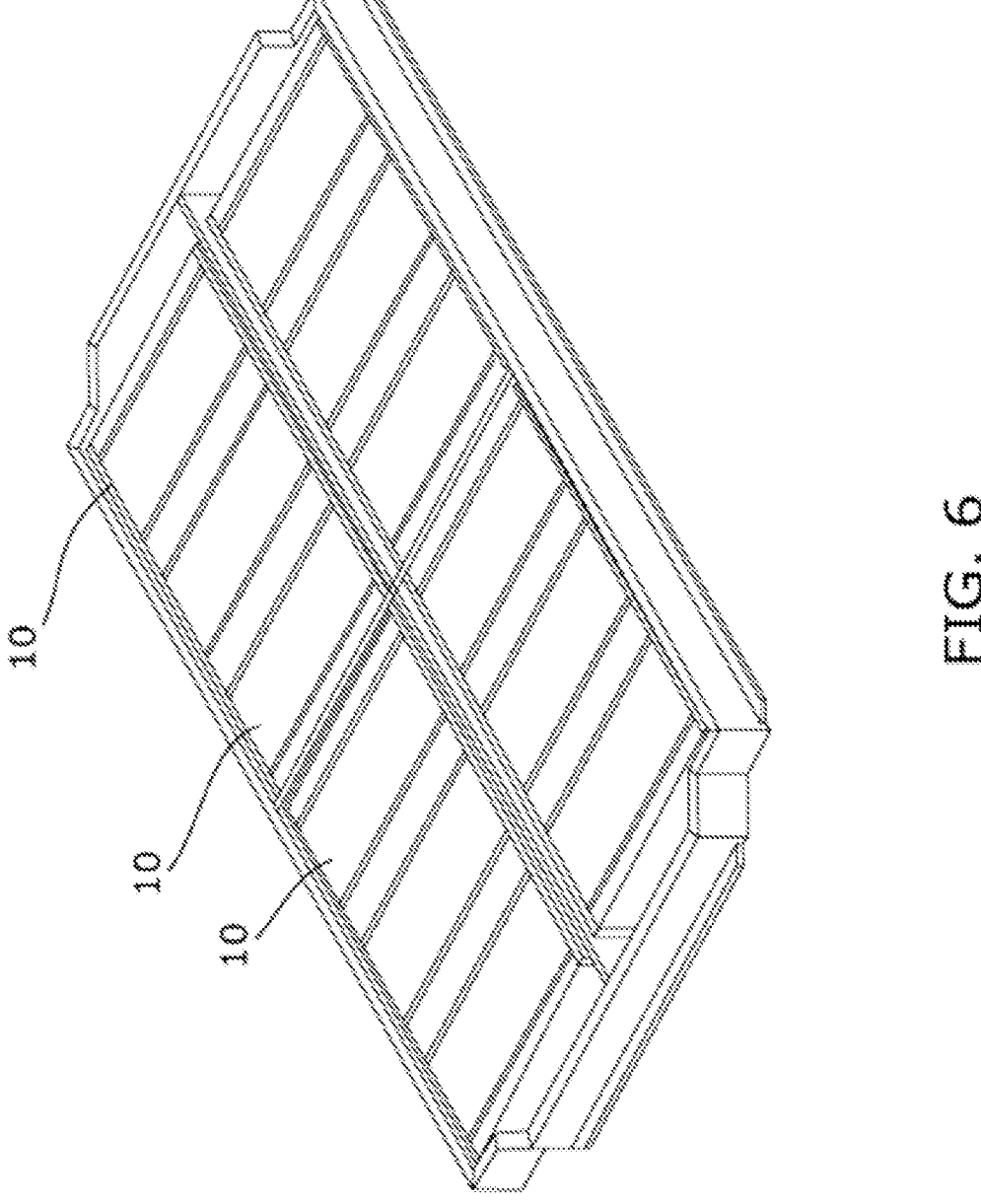
FIG. 6 is a perspective view of a plurality of the present systems positioned together in a tunnel arrangement along the center console.

5 of battery module devices 10 and various numbers of battery module devices 10 may in turn be stacked together. For example, as seen in FIG. 5, a plurality of four of the present systems as shown in FIG. 4 can be positioned together on top of a battery bottom enclosure 120. Lastly, as seen in FIG. 6, a plurality of battery module devices 10 can be positioned together as a flat floor battery pack that can be positioned in the chassis of an electric vehicle.

What is claimed is:

1. A battery module, comprising:
   a pouch cell module comprising:
      a first cell;
      a second cell; and
      an insulation pad disposed between the first cell and the second cell;
   a busbar in electrical communication with the pouch cell module;
   a first tab having a corresponding proximal end in contact with the first cell, the first tab extending away from the corresponding proximal end in contact with the first cell only in a first direction to a corresponding distal end to make contact with the busbar; and
   a second tab comprising:
      a first portion having a corresponding proximal end in contact with the second cell, the first portion extending away from the corresponding proximal end in contact with the second cell, across the insulation pad disposed between the first cell and the second cell, and towards the first cell in a second direction to a corresponding distal end of the first portion to make contact with the first tab, the second direction perpendicular to the first direction, wherein the first portion of the second tab is perpendicular to the first tab; and
      a second portion extending from the corresponding distal end of the first portion only in the first direction away from the insulation pad to a corresponding distal end of the second portion to make contact with the busbar, the second portion of the second tab perpendicular to the first portion of the second tab.

2. The battery module of claim 1, wherein the insulation pad is thermally coupled to the first cell and the second cell and configured to transfer heat away from each of the first cell and the second cell.

3. The battery module of claim 1, wherein the first tab and the second tab are ultrasonically welded together.

4. The battery module of claim 1, further comprising:
   a first bracket; and
   a second bracket, wherein the first cell and the second cell are disposed between the first bracket and the second bracket.

5. The battery module of claim 1, further comprising:
   a third tab extending away from the first cell in a third direction opposite the first direction; and
   a fourth tab extending away from the second cell in the third direction.

6. The battery module of claim 5, wherein the third tab and the fourth tab are coupled together.

7. The battery module of claim 1, further comprising a slave board in electrical communication with the pouch cell module.

8. The battery module of claim 7, wherein the slave board is configured to monitor a voltage and a temperature of the pouch cell module.

9. A battery module comprising:
   a busbar; and
   a plurality of pouch cell modules in electrical communication with the busbar, each pouch cell module of the plurality of pouch cell modules comprising:
      a first cell;
      a second cell;
      an insulation pad disposed between the first cell and the second cell;
      a first top tab having a corresponding proximal end in contact with the first cell, the first top tab extending away from the corresponding proximal end in contact with the first cell only in a first direction to a corresponding distal end to make contact with the busbar; and
      a second top tab comprising:
         a first portion having a corresponding proximal end in contact with the second cell, the first portion extending away from the corresponding proximal end in contact with the second cell, across the insulation pad disposed between the first cell and the second cell, and towards the first cell in a second direction to a corresponding distal end of the first portion to make contact with the first top tab, the second direction perpendicular to the first direction, wherein the first portion of the second top tab is perpendicular to the first top tab; and
         a second portion extending from the corresponding distal end of the first portion only in the first direction away from the insulation pad to a corresponding distal end of the second portion to make contact with the busbar, the second portion of the second top tab perpendicular to the first portion of the second top tab.

10. The battery module of claim 9, wherein the insulation pad is thermally coupled to the first cell and the second cell and configured to transfer heat away from each of the first cell and the second cell.

11. The battery module of claim 9, wherein the first top tab and the second top tab are ultrasonically welded together.

12. The battery module of claim 9, further comprising:
   a first bracket; and
   a second bracket, wherein the first cell and the second cell are disposed between the first bracket and the second bracket.

13. The battery module of claim 9, further comprising:
   a third tab extending away from the first cell in a third direction opposite the first direction; and
   a fourth tab extending away from the second cell in the third direction.

14. The battery module of claim 13, wherein the third tab and the fourth tab are coupled together.

15. The battery module of claim 9, further comprising a slave board in electrical communication with each pouch cell module of the plurality of pouch cell modules.

16. The battery module of claim 15, wherein the slave board is configured to monitor a voltage and a temperature of each pouch cell module of the plurality of pouch cell modules.

* * * * *